United States Patent
Park et al.

(10) Patent No.: US 6,995,104 B2
(45) Date of Patent: Feb. 7, 2006

(54) POLYCRYSTALLINE MGO DEPOSITION MATERIAL HAVING ADJUSTED SI CONCENTRATION

(75) Inventors: Eung Chul Park, Gyeongsangbuk-do (KR); Hideaki Sakurai, Naka-machi (JP); Yoshirou Kuromitsu, Naka-machi (JP); Ginjiro Toyoguchi, Naka-machi (JP)

(73) Assignees: LG Electronics Inc., Seoul (KR); Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/682,039

(22) Filed: Oct. 10, 2003

(65) Prior Publication Data

US 2004/0131884 A1    Jul. 8, 2004

(30) Foreign Application Priority Data

Oct. 10, 2002    (JP)    .............................. 2002-296861

(51) Int. Cl.
    *C04B 35/04* (2006.01)
(52) U.S. Cl. ...................... 501/108; 501/122; 428/690; 106/286.6
(58) Field of Classification Search ................ 501/108, 501/122; 428/690; 106/286.6
See application file for complete search history.

(56) References Cited

U.S. PATENT DOCUMENTS

2005/0045065 A1 *   3/2005   Sakurai et al. ........... 106/286.8

FOREIGN PATENT DOCUMENTS

| JP | 10-297956 | * 11/1998 |
| JP | 11-29355 | * 2/1999 |
| JP | 11-29857 | * 2/1999 |
| JP | 2000-63171 | * 2/2000 |
| JP | 2000-103614 | * 4/2000 |

* cited by examiner

*Primary Examiner*—Karl Group
(74) *Attorney, Agent, or Firm*—Birch, Stewart, Kolasch & Birch, LLP

(57) ABSTRACT

It is an object of the present invention to provide a polycrystalline MgO deposition material which is capable of obtaining a good discharge response characteristic over a wide temperature range. Additionally, it is another object of the present invention to provide a plasma display panel with an improved luminance and a material for the plasma display panel which can remarkably reduce the number of address ICs without lowering the panel luminance. In order to achieve the objects, there is provided an improvement of a polycrystalline MgO deposition material for a passivation layer of the plasma display panel. A characteristic structure is that the polycrystalline MgO deposition material is formed of a sintered pellet of polycrystalline MgO, of which MgO purity is more than 99.9% and relative density is more than 90%. Further, a Si concentration in the polycrystalline MgO is more than 30 ppm and less than 500 ppm.

3 Claims, 2 Drawing Sheets

POLYCRYSTALLINE MGO DEPOSITION MATERIAL HAVING ADJUSTED SI CONCENTRATION

This application claims the benefit of the Japanese Application No. P2002-296861 filed on Oct. 10, 2002, which is hereby incorporated by reference.

BACKGROUND OF THE INVENTION

1. Field of the Invention

The present invention relates to a polycrystalline MgO deposition material which is a raw material of MgO film used as the passivation layer of an AC type plasma display panel, and more particularly, to a polycrystalline MgO deposition material which is a raw material of MgO film having a good response characteristic in a wide temperature range and an AC type plasma display panel using the MgO film.

2. Discussion of the Related Art

In recent, research and development for a variety of flat panel displays including a liquid crystal display (LCD) have been actively performed so that their utilization has been remarkably advanced and production is being increased sharply. The drift for development and utilization of a color plasma display panel (hereinafter referred to as "PDP") is also being actively performed. PDP has an advantage of a large-sized screen. In real, a PDP with a diagonal length of 40 inches in the shortest distance of a large-sized hang-on-the-wall TV for a hivision is being fabricated. PDPs are classified into an AC type PDP in which the metal electrode is covered with dielectric glass material and a DC type PDP in which the metal electrode is exposed to a discharge space according to the electrode structure.

In an initial developing stage of the AC type PDP, since the dielectric glass layer is directly exposed to the discharge space, the surface of the dielectric glass layer is deformed by an ion impact of sputtering and thereby discharge start voltage is elevated. To this end, there were tries to use various oxides having a high sublimation heat as the passivation layer of the dielectric glass layer. The passivation layer plays an important role because it is in direct contact with the discharge gas. In other words, the passivation layer should satisfy the following conditions of (1) low discharge voltage, (2) sputtering-resistant capability in discharge, (3) rapid discharge response, and (4) insulation. MgO is a material to satisfy the above four conditions and is used as the passivation layer. The passivation layer of MgO protects the surface of the dielectric glass layer from sputtering on discharge and plays an important role in lengthening the life of the PDP.

However, MgO has a drawback in that when used as the passivation layer, display scattering called "black noise" is frequently generated. Black noise is a kind of scattering phenomenon in which a to-be-turned-on cell (selected cell) is not turned on, and it is known that the black noise is easily generated at a boundary between the to-be-turned-on region and the not-to-be-turned-on region. Since all the selected cells on one line or one column are not turned on but its generation region exists sporadically, the black noise is determined as an address miss in which address discharge is not generated or if generated, its intensity is insufficient.

As a way to solve the aforementioned all the problems, disclosed is a PDP (see cited patent reference 1), which uses an MgO film formed by an vacuum evaporation method and containing Si in a ratio of 500–10,000 ppm by weight. In the cited reference 1, there is disclosed a fact that the address miss that is a reason of the black noise is suppressed because the MgO film contains Si in the aforementioned ratio.

In the cited patent reference 2, disclosed is a PDP, which uses an MgO film containing Si in a ratio of 1,000–40,000 ppm by weight by a thermal decomposition of fatty acid salt as the sputtering-resistant film. According to the cited reference 2, the electrical characteristic of the PDP is improved by a micro component contained in the MgO film formed by the thermal decomposition of the fatty acid salt. Also, discharge amount of secondary electrons is increased, lowering in effective voltage due to residual charge is supplemented and the residual of charges is reduced and rapidly lost, so that the address miss acting as the black noise can be suppressed.

In the meanwhile, it is known that the response of the PDP is influenced by various conditions of discharge cell shape, applied voltage on operation of PDP, frequency and the like (for instance, see cited non-patent reference 1). The non-patent reference 1 discloses a method for evaluating response of PDP.

In addition, it is known that the response is improved by irradiating vacuum ultraviolet rays in discharge cells (for instance, see cited non-patent reference 2). The non-patent reference 2 also disclose a method for evaluating response of PDP.

CITED REFERENCE

Patent reference 1: Japanese Patent No. 3247632

Patent reference 2: Japanese Patent Laid Open Publication No. 2001-110321

Non-patent reference 1: A. Seguin, L. Tessier, H. Doyeux and S. Salavin, "Measurement of Addressing Speed in Plasma Display Devices.", IDW'99, p699–702

Non-patent reference 2: R. Ganter, Th. Callegari, N. Posseme, B. Caillier and J. P. Boeuf, "Photoemission in Plasma Display Panel Discharge Cells.", IDW'00, p731–734.

The patent references 1 and 2 and the non-patent references 1 and 2 do not deal with the temperature condition on response evaluation specially. To this end, it is determined that their response evaluation is performed at a temperature near the room temperature.

However, the guaranteed temperature of the PDP has a large deviation depending on the providers. For instance, the lowest temperature is 0° C., preferably −15° C., and the highest temperature of 70° C., preferably 90° C. So, the inventor evaluated and investigated the discharge response in a wide temperature range of −15° C. to 90° C., and finds that the response does not depend on the temperature. Specifically, if the discharge response time in a selected temperature exceeds a critical value, record discharge failure is generated, so that there may be caused a problem that the panel is blinking. Also, if the discharge response is not good, it is necessary to lengthen the response period, so that sustain period is shortened and a sufficient luminance cannot be obtained. To this end, in a conventional method, dual scan is performed to improve the panel luminance. However, since the dual scan needs many address ICs, the circuit prices is elevated.

SUMMARY OF THE INVENTION

Accordingly, the present invention is directed to a polycrystalline MgO deposition material having an adjusted Si concentration that substantially obviates one or more problems due to limitations and disadvantages of the related art.

An object of the present invention is to provide a polycrystalline MgO deposition material in which a good discharge response is obtained in a wide temperature range.

Another object of the present invention is to provide a polycrystalline MgO deposition material used as a material of a PDP in which the address period is extended and the sustain period is shortened to enhance the panel luminance.

A further object of the present invention is to provide a polycrystalline MgO deposition material used as a material of a PDP in which the number of the address ICs is remarkably reduced without lowering the panel luminance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a polycrystalline MgO deposition material for a passivation layer of a plasma display panel includes a sintered pellet of a polycrystalline MgO, of which MgO purity is more than 99.9% and relative density is more than 90%, in which a Si concentration in the polycrystalline MgO deposition material is more than 30 ppm and less than 500 ppm.

The MgO layer formed of the MgO deposition material according to the present invention can obtain a good discharge response characteristic in a wide range of temperature.

Preferably, the Si concentration in the polycrystalline MgO deposition material is in a range of 220 ppm to 480 ppm.

Preferably, the Si concentration in the polycrystalline MgO deposition material is in a range of 250 ppm to 450 ppm.

Preferably, the Si concentration in the polycrystalline MgO deposition material is in a range of 280 ppm to 350 ppm.

The MgO layer formed of the MgO deposition material constructed as above can obtain a good discharge response characteristic in a wide range of temperature.

A PDP using the MgO layer formed of the above polycrystalline MgO deposition material can obtain a good response characteristic in a wide temperature range. The address period is extended and the sustain period is shortened to enhance the panel luminance. Further, the number of the address ICs is remarkably reduced without lowering the panel luminance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
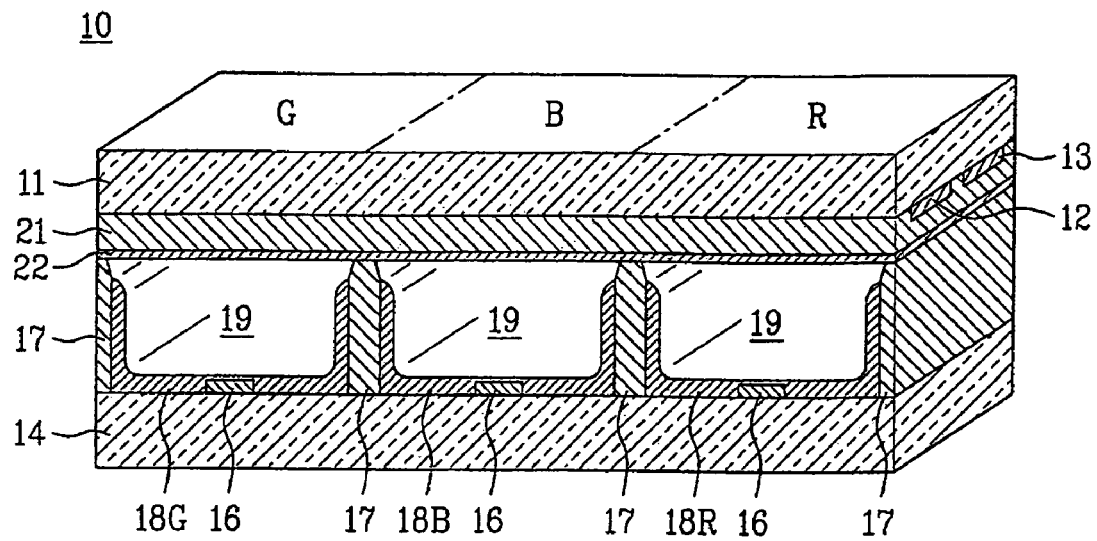
FIG. 1 is a sectional perspective view of an internal structure of a PDP.

Reference will now be made in detail to the preferred embodiments of the present invention to achieve the objects, with examples of which are illustrated in the accompanying drawings. Wherever possible, the same reference numbers will be used throughout the drawings to refer to the same or like parts.

This inventor scrutinizes an influence of kinds and content of impurities, which is contained in polycrystalline MgO deposition material and MgO layer formed using the material, on a response characteristic and acknowledges that the response characteristic is influenced by a concentration of silicon (Si) contained in the polycrystalline MgO. Additionally, as the Si concentration in the polycrystalline MgO is increasing, a discharge response characteristic is generally improved. However, if the Si concentration is increasing too much, the discharge response characteristic is degraded. Therefore, it is known that there is an optimum range of the Si concentration when considering an application to products. The reason why the temperature dependence exists is that a secondary electron emission is improved due to an addition of Si.

A polycrystalline MgO deposition material having an adjusted Si concentration according to the present invention is an improved deposition material for a passivation layer used in a PDP, and consists of a sintered pellet of polycrystalline Mgo, whose MgO purity is more than 99.9% and whose relative density is more than 90%. A characteristic structure is that the Si concentration in the polycrystalline MgO is more than 30 ppm and less than 500 ppm.

In the MgO deposition material of the present invention, in which the Si concentration in the polycrystalline MgO is contained at a rate of the above concentration range, Si exists in a form of a particle-shaped precipitate of submicron to about 5 $\mu$m within a grain boundary and a particle of MgO matrix. A result of a measurement using an electron probe microanalyzer (EPMA) shows that Si in the MgO deposition material of the present invention exists in a form of an oxide compound such as $CaSiO_4$, $CaMgSi_2O_4$, $MgSiO_3$ and the like, or in a form of $SiO_2$.

If the Si concentration in the polycrystalline MgO is less than a lower limit or more than an upper limit, a problem happens in a response characteristic at a low temperature. Here, the Si concentration is preferably in a range of 220 ppm to 480 ppm, more preferably, 250 ppm to 450 ppm. Even more preferably, the Si concentration is in a range of 280 ppm to 350 ppm.

An X-ray diffractmeter (XRD) is used to measure Si contained in an MgO layer, which is formed of the MgO deposition material by an electron beam deposition method. A result of the measurement shows that materials except for MgO, i.e., materials such as the oxide compound which exists in the MgO deposition material, are not found. Further, a lattice constant of the MgO in the MgO layer of the present invention is slightly smaller than that of a general MgO. Therefore, it can be estimated that Si having a smaller ion radius than Mg exists within MgO lattice.

Hereinafter, a method for forming the MgO deposition material according to the present invention will be described.

First, a slurry having a concentration of 30 wt % to 75 wt % is manufactured by mixing a high-purity MgO powder of more than 99.9%, a high-purity silica powder in which a Si concentration in a polycrystalline MgO is more than 30 ppm and less than 500 ppm, a binder and an organic solvent. Preferably, a slurry of 40 wt % to 65 wt % is manufactured. The reason why the concentration of the slurry is limited to 30 wt % to 75 wt % is that it is impossible to obtain a stable mixed granulation since the slurry is a non-aqueous base if the concentration exceeds 75 wt %, and it is possible to obtain a dense MgO sintered body having an uniform structure if the concentration is less than 30 wt %. Preferably, an average particle diameter of the MgO powder is in a range of 0.1 $\mu$m to 5.0 $\mu$m. The reason why the average particle diameter of the MgO powder is limited as above is that a handing of the powder gets worse and it is difficult to manufacture a high-purity slurry, since the powder is very small and thus aggregated if it is less than a lower limit. Additionally, if the average particle diameter is more than an upper limit, it is impossible to obtain a dense sintered-body pellet since a control of a fine structure is difficult.

It is preferable that the silica powder is provided with silica particles having a primary particle diameter of nanoscale, considering a prevention of segregation in an existence amount of Si, a response characteristic with an MgO matrix and a purity of Si compound. Particularly, it is preferable to use an ultrafine silica (aerosol), which is obtained by a vapor phase method and of which surface area ratio is in a range between 50 $m^2$/g to 300 $m^2$/g.

It is preferable to use polyethylene glycol or polyvinyl butyral as the binder and to use ethanol or propanol as the organic solvent. Additionally, it is preferable to add the binder of 0.2 wt % to 5.0 wt %.

Further, a wet mix process of the high-purity powder, the binder and the organic solvent, particularly a wet mix process of the high-purity powder and the organic solvent used as a dispersion medium, is achieved by a wet ball mill or an agitating mill. In case $ZrO_2$ ball is used, the wet ball mill performs the wet mix process for 8 hours to 24 hours, preferably 20 hours to 24 hours, by using several $ZrO_2$ balls each having a diameter of 5 mm to 10 mm. The reason why the diameter of the $ZrO_2$ ball is limited to 5 mm to 10 mm is that the mix is insufficient at a diameter of less than 5 mm and an impurity increases at a diameter of more than 10 mm. Additionally, the reason why the mix time is 24 hours at the longest is that only a little impurity occurs even if a continuous mix is performed for a long time.

In case of the agitating mill, a $ZrO_2$ ball mill having a diameter of 1 mm to 3 mm is used to perform a wet mix process for 0.5 hour to 1 hour. The reason why the diameter of the $ZrO_2$ ball is limited to 1 mm to 3 mm is that the mix is insufficient at a diameter of less than 1 mm and an impurity increases at a diameter of more than 3 mm. Additionally, the reason why the mix time is 1 hour at the longest is that an impurity occurs since the ball itself as well as the mix of the ingredients is damaged if the mix time exceeds 1 hour, and 1 hour is enough to achieve the mix.

Then, a mixed granulated powder whose average particle diameter is 50 $\mu$m to 250 $\mu$m, preferably 50 $\mu$m to 200 m$\mu$, is obtained by a spray drying of the slurry. The granulated powder is put into a predetermined mold and then molded at a predetermined pressure. Preferably, the spray drying process is performed using a spray drier and a uniaxial press apparatus or a cold isostatic press (CIP) molding apparatus is used therein. The uniaxial press apparatus performs an uniaxial pressure molding process to the granulated powder at a pressure of 750 kg/$cm^2$ to 2000 kg/$cm^2$, preferably 1000 kg/$cm^2$ to 1500 kg/$cm^2$, and the CIP molding apparatus performs a CIP molding process to the granulated powder at a pressure of 1000 kg/$cm^2$ to 3000 kg/$cm^2$, preferably 1500 kg/$cm^2$ to 2000 kg/$cm^2$. The reason why the pressure is limited as above is that a post-processing is not needed since a density of the molded body is increased and a deformation after the sintering is prevented.

Further, the molded body is sintered at a predetermined temperature. The sintering is performed under an atmosphere or an environment of inert gas, vacuum or reducing gas at a temperature of more than 1350° C., preferably 1400° C. to 1800° C., for 1 hour to 10 hours, preferably 2 hours to 8 hours. Consequently, a sintered body pellet having a relative density of 90% is obtained. The sintering is carried out at an atmosphere. However, in case of a pressure sintering such as a hot press (HP) sintering or a hot isostatic press (HIP) sintering, it is preferable that the sintering is carried out under an environment of inert gas, vacuum or reducing gas at a temperature of more than 1350° C. for 1 hour to 5 hours.

An MgO layer is formed on a surface of a substrate using the polycrystalline MgO deposition material of the sintered pellet.

FIG. 1 is a perspective view of an internal structure of a PDP according to the present invention.

Generally, a surface discharge AC plasma display panel (PDP) 10 includes a sustain electrode 12 and a scan electrode 13, which are paired with each other and arranged in parallel in a screen width direction of a front glass substrate 11. Additionally, an address electrode 16 is arranged in a screen length direction of a rear glass substrate 14. A gap between the sustain electrode 12 and the scan electrode 13 is called a "discharge gap" and set to about 80 $\mu$m. Additionally, the front glass substrate 11 and the rear glass substrate 14 are spaced apart from each other by a rib 17 that has a height of 100 $\mu$m to 150 $\mu$m, and a phosphor powder 18 is coated on both a wall and a bottom of the rib 17. In case of a color display, phosphors 18G, 18B and 18R of three colors R, G and B are coated on both a rear portion and a bottom of the rib 17, which forms three discharge spaces arranged in a line direction, to thereby form three subpixels (unit light emitting area) that are provided as one pixel. A gas is sealed in the discharge space 19 defined by the front glass substrate 11, the rear glass substrate 14 and the rib 17. A mixed gas of inert gases, such as neon (Ne) or xenon (Xe), is used as the sealed gas.

In order to reduce an ion bombardment due to a discharge gas at a discharge process, a high sputtering tolerant passivation layer 22 is formed on a surface of a dielectric glass layer 21 that coats the sustain electrode 12 and the scan electrode 13. In the PDP, the passivation layer acts as a discharge electrode because material and layer quality of the passivation layer 22 influence a discharge characteristic. The passivation layer is formed of the MgO layer of the present invention, which is an insulating material that is tolerant to the sputtering and has a high secondary electron emission constant.

In the matrix display type AC PDP constructed as above, a plasma discharge is carried out between the sustain electrode 12, and the scan electrode 13 and the address electrode 16, which face each other within the discharge space 19 provided between the front glass substrate 11 and the rear glass substrate 14. Then, ultraviolet light emitted from the gas that is sealed within the discharge space 19 is illuminated to the phosphor 18 installed in the discharge space 19 to thereby perform the display process. A memory effect is used to sustain a lighting state of a cell that is a display element. When an image is displayed, wall charges of an entire screen are reset until a next image is addressed after finishing the sustaining of a certain image. Then, an addressing process of accumulating wall charges in only the to-be-emitted cells is performed in an order of lines. Then, a voltage (sustain voltage) that is lower than an AC discharge start voltage is simultaneously applied to all cells. In the cells in which the wall charges exist, the wall charges are overlapped with the sustain voltage and thus an effective voltage applied to the cell exceeds the discharge start voltage such that the discharge occurs. It is possible to obtain seemingly a continuous lighting state by increasing an applied frequency of the sustain voltage.

In the addressing process, an address discharge is performed between the address electrode of the rear glass substrate and the scan electrode of the front glass substrate, thereby accumulating the wall charges. For example, in a PDP having a resolution of 256 gray scales (8 subfields) in a visual graphics array (VGA) class, 480 lines must be sequentially addressed when the address discharge is performed at 3 µm. Therefore, about 10% of a driving time is spent in resetting the wall charges and about 70% of the driving time is spent in writing an image data. Consequently, an actual image display time is merely about 20%. In the case of the PDP, as the image display time is longer, a panel luminance is recognized to be brighter. The number of address ICs is doubled in order to improve the panel luminance, and upper and lower portions of the image are separately written (dual scan), thereby reducing the addressing time and increasing the image display time. However, this method has a problem of raising the price of circuit.

On the contrary, the MgO layer formed of the MgO deposition material according to the present invention can obtain a good discharge response characteristic over a wide range of temperature. Consequently, the address discharge time can be reduced. Therefore, the PDP using the passivation layer according to the present invention can increase the image display time, so that the panel luminance is improved. Additionally, the number of the address ICs can be greatly reduced without lowering the panel luminance.

[Embodiments]

Hereinafter, embodiments of the present invention will be described in detail with reference to comparative examples.

[Embodiment 1]

A sintered pellet is prepared as a polycrystalline MgO deposition material. The sintered pellet has an MgO purity of 99.95% and a relative density of 98%. Additionally, a concentration of Si contained in the polycrystalline MgO is 330 ppm. A size of the pellet is 5 mm φ to 1.6 mmt. An ITO electrode and a silver electrode are stacked on a surface to thereby form an electrode. Additionally, a glass substrate having a dielectric glass layer formed thereon is prepared so as to coat the electrode.

An MgO layer having a layer thickness of 8000 Å and a crystal orientation (111) is formed on the dielectric glass layer by an ion beam deposition method. Conditions of the layer formation are that an arrival vacuum level is $1.0 \times 10^{-4}$ Pa, a partial pressure of oxygen gas is $1.0 \times 10^{-2}$ Pa, a substrate temperature is 200° C., and a layer formation speed is 20 Å/s.

[Embodiment 2]

A sintered pellet is prepared as a polycrystalline MgO deposition material. The sintered pellet has an MgO purity of 99.91% and a relative density of 94%. Additionally, a concentration of Si contained in the polycrystalline MgO is 250 ppm. Other processes of forming the MgO layer are the same as the embodiment 1.

[Embodiment 3]

A sintered pellet is prepared as a polycrystalline MgO deposition material. The sintered pellet has an MgO purity of 99.93% and a relative density of 92%. Additionally, a concentration of Si contained in the polycrystalline MgO is 400 ppm. Other processes of forming the MgO layer are the same as the embodiment 1.

[Embodiment 4]

A sintered pellet is prepared as a polycrystalline MgO deposition material. The sintered pellet has an MgO purity of 99.95% and a relative density of 95%. Additionally, a concentration of Si contained in the polycrystalline MgO is 450 ppm. Other processes of forming the MgO layer are the same as the embodiment 1.

[Embodiment 5]

A sintered pellet is prepared as a polycrystalline MgO deposition material. The sintered pellet has an MgO purity of 99.98% and a relative density of 98%. Additionally, a concentration of Si contained in the polycrystalline MgO is 30 ppm. In the same manner as the embodiment 1, an MgO layer is formed using the sintered pellet. Then, a PDP module is manufactured using the MgO layer. The manufactured module is driven by an address display separation (ADS) method, and a response time of an address discharge at an actual equipment is evaluated.

[Embodiment 6]

A sintered pellet is prepared as a polycrystalline MgO deposition material. The sintered pellet has an MgO purity of 99.98% and a relative density of 98%. Additionally, a concentration of Si contained in the polycrystalline MgO is 300 ppm. An MgO layer is formed using the sintered pellet in the same manner as the embodiment 1 and a PDP module is manufactured like the embodiment 5. The manufactured module is driven by the ADS method, and a response time of an address discharge at an actual equipment is evaluated.

[Comparative Example 1]

A sintered pellet is prepared as a polycrystalline MgO deposition material. The sintered pellet has an MgO purity of 99.96% and a relative density of 98%. Additionally, a concentration of Si contained in the polycrystalline MgO is 25 ppm. Other processes of forming the MgO layer are the same as the embodiment 1.

[Comparative Example 2]

A sintered pellet is prepared as a polycrystalline MgO deposition material. The sintered pellet has an MgO purity of 99.90% and a relative density of 95%. Additionally, a concentration of Si contained in the polycrystalline MgO is 550 ppm. Other processes of forming the MgO layer are the same as the embodiment 1.

[Comparative Example 3]

A sintered pellet is prepared as a polycrystalline MgO deposition material. The sintered pellet has an MgO purity of 99.0% and a relative density of 95%. Additionally, a concentration of Si contained in the polycrystalline MgO is 240 ppm. Other processes of forming the MgO layer are the same as the embodiment 1.

[Comparative Example 4]

A sintered pellet is prepared as a polycrystalline MgO deposition material. The sintered pellet has an MgO purity of 99.98% and a relative density of 98%. Additionally, a concentration of Si contained in the polycrystalline MgO is 1000 ppm. An MgO layer is formed using the sintered pellet in the same manner as the embodiment 1 and a PDP module is manufactured like the embodiment 5. The manufactured module is driven by the ADS method, and a response time of an address discharge at an actual equipment is evaluated.

[Comparative Test and Evaluation]

Test substrates are manufactured using glass substrates that include the MgO layer obtained from the embodiments 1 to 4 and the comparative examples 1 to 3. Specifically, the glass substrate including the MgO layer is used as the front glass. Then, silver charges and white dielectric glass layer are stacked, and the rear glass substrate is provided thereon. At this time, the rear glass substrate includes a rib having a height of 150 μm and a pitch of 360 μm. The rear glass substrate and the front glass substrate are arranged to face each other. Ne-4% Xe mixed gas is injected as the discharge gas on the discharge space that is defined by the front glass substrate, the rear glass substrate and the rib.

Figure 2:
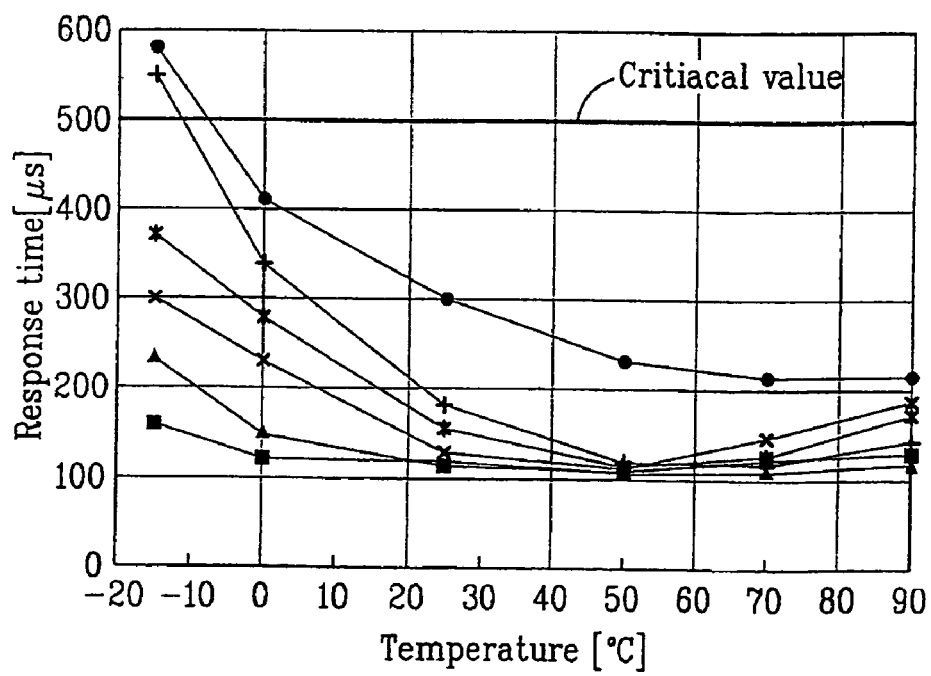
FIG. 2 is a view showing a relationship between response characteristic and a temperature at MgO layer according to first to fourth embodiments of the present invention and first to third comparative examples.

Using the test substrates, similar address discharge tests (i.e., discharge tests between two glass substrates) are carried out under conditions of −15° C., 0° C., 25° C., 50° C., 70° C. and 90° C. The test is carried out under conditions that a discharge gas pressure is 150 Torr (i.e., about $2.0 \times 10^4$ Pa), an applied voltage is 250 V, and a frequency is 10 Hz. Fore infrared rays emitted due to the discharge are detected by a photomultiplier tube, and a time from an application of the voltage to a finishing of the light emitting is evaluated as the response time. Meanwhile, the response time includes a statistical light emitting deviation. A test result is shown in FIG. 2. In FIG. 2, an actual response characteristic is evaluated in a 42-inch panel manufactured using the MgO layer formed under the same conditions. Then, in comparison with the result of the evaluation, a critical value represented by a thick line is set to 500 μs.

As can be obviously seen from FIG. 2, in case of the comparative example 3 in which the MgO having a lower purity than the MgO of the present invention is used, the test result at about room temperature greatly exceeds the critical value. Therefore, the response characteristic is degraded if the low-purity MgO deposition material is used. In case of the comparative example 1 in which the Si concentration is lower than that of the present invention, and in case of the comparative example 2 in which the Si concentration is higher than that of the present invention, the response time exceeds the critical value at the temperature of −15° C. If the concentration of Si contained in the MgO is lower than a lower limit (30 ppm) or higher than a upper limit (500 ppm), which are regulated in the present invention, it can be seen from the above results that there is a problem in the response characteristic at a low temperature. From the result of the response time exceeding the critical value, if the MgO layers formed under the same conditions as the comparative examples 1 to 3 are used to actually manufacture the 42-inch panel and the panel is driven, the addressing error occurs, so that it can be estimated to ascertain a blinking on the panel. On the contrary, in case of the embodiments 1 to 4 in which the Si concentration in the MgO is in a concentration range (more than 30 ppm and less than 500 ppm) according to the present invention, the response time of less than the critical value is over a wide range of −15° C. to 90° C. Therefore, the response characteristic is very good.

The modules manufactured at the embodiments 5 and 6 and the comparative example 4 are driven by the ADS method and the response time of the address discharge at an actual equipment is evaluated. The test results are shown in FIG. 3.

Figure 3:
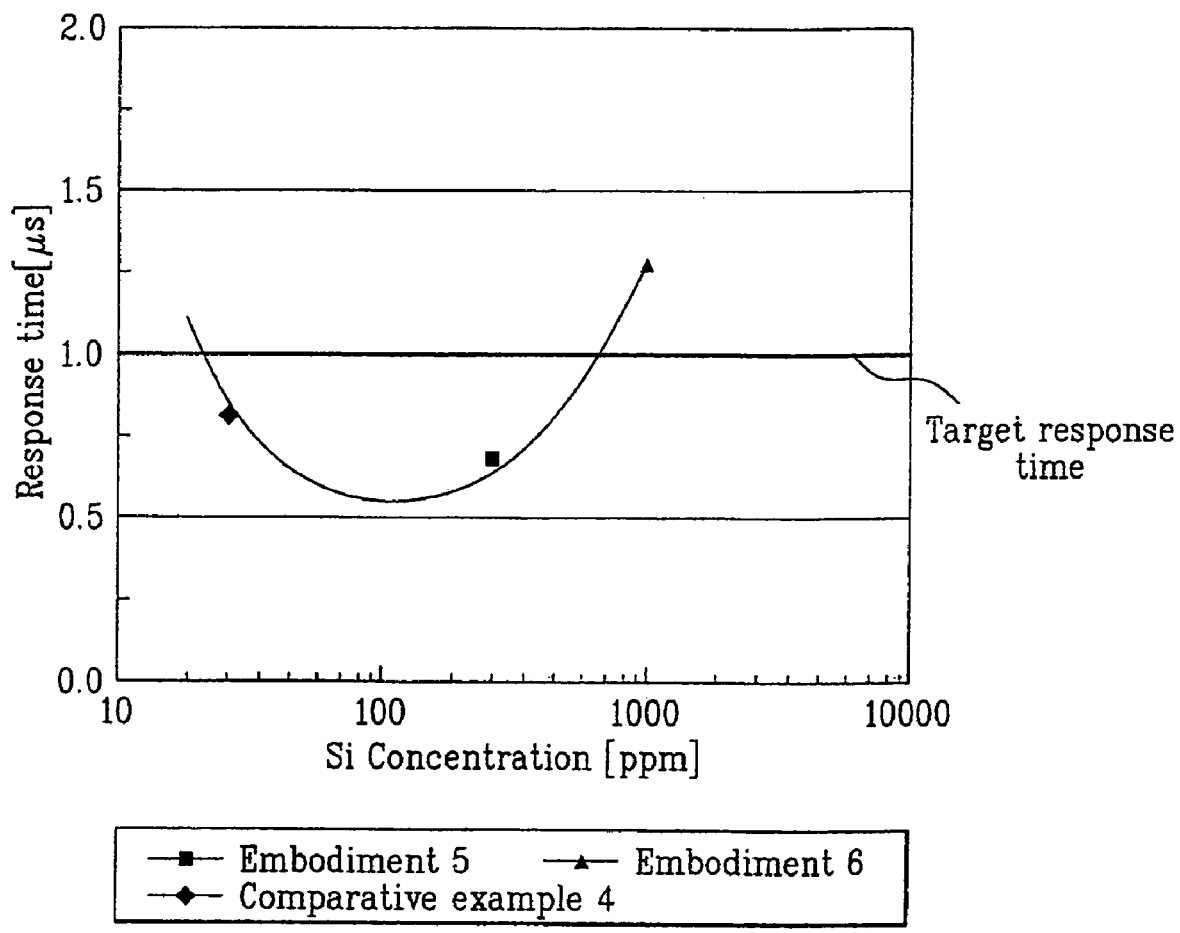
FIG. 3 is a view showing a relationship between a response characteristic and a Si concentration at an address discharge in a PDP module according to fifth and sixth embodiments and fourth comparative example.

As shown in FIG. 3, in the embodiments 5 and 6 in which the Si concentration is respectively 30 ppm and 300 ppm, the response time is shorter than a target response time (less than 1 μm), thereby obtaining a good result. On the contrary, the comparative example 4 in which the Si concentration is 1000 ppm exceeds the target response time, so that there occurs a problem in the response characteristic. Accordingly, it is known that an optimum concentration range exits in the Si concentration in the MgO layer with respect to the response characteristic.

As described above, the polycrystalline MgO deposition material having an adjusted Si concentration according to the present invention is an improved deposition material for a passivation layer used in a PDP, and consists of a sintered pellet of polycrystalline MgO, whose MgO purity is more than 99.9% and whose relative density is more than 90%. Further, the Si concentration in the polycrystalline MgO is more than 30 ppm and less than 500 ppm. The MgO layer formed using the MgO deposition material whose Si concentration is regulated within the above range can obtain a good discharge response characteristic over a wide temperature range. Furthermore, the PDP manufactured using the MgO can improve the panel luminance and remarkably reduce the number of address ICs without lowering the panel luminance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A polycrystalline MgO deposition material for a passivation layer of a plasma display panel, comprising:
   a sintered pellet of a polycrystalline MgO, in which the MgO purity is more than 99.9% and the relative density is more than 90%, wherein a Si concentration in the polycrystalline MgO deposition material is in a range of 220 ppm to 480 ppm.

2. A polycrystalline MgO deposition material for a passivation layer of a plasma display panel, comprising:
   a sintered pellet of a polycrystalline MgO, in which the MgO purity is more than 99.9% and the relative density is more than 90%, wherein a Si concentration in the polycrystalline MgO deposition material is in a range of 250 ppm to 450 ppm.

3. A polycrystalline MgO deposition material for a passivation layer of a plasma display panel, comprising:
   a sintered pellet of a polycrystalline MgO, in which the MgO purity is more than 99.9% and the relative density is more than 90%, wherein a Si concentration in the polycrystalline MgO deposition material is in a range of 280 ppm to 350 ppm.

* * * * *